United States Patent
Ogunjobi (10) Patent No.: US 6,402,221 B1
(45) Date of Patent: Jun. 11, 2002

(54) MOTOR VEHICLE EXTENDABLE SUN VISOR

(76) Inventor: Edward Adegoke Ogunjobi, 171 Stillwell La., Syosset, NY (US) 11791

( * ) Notice: Subject to any disclaimer, the term of this patent is extended or adjusted under 35 U.S.C. 154(b) by 0 days.

(21) Appl. No.: 09/351,450

(22) Filed: Jul. 12, 1999

(51) Int. Cl.⁷ .................................................. B60J 3/02
(52) U.S. Cl. .................... 296/97.6; 296/97.8; 296/97.9; 296/97.11
(58) Field of Search ............................. 296/97.6, 97.8, 296/97.9, 97.11

(56) References Cited

U.S. PATENT DOCUMENTS

| | | | |
|---|---|---|---|
| 2,422,863 A | | 6/1947 | Stroth |
| 3,834,755 A | * | 9/1974 | Dexter ..................... 296/97 G |
| 3,948,554 A | * | 4/1976 | Barbee ..................... 296/97 C |
| 3,954,297 A | * | 5/1976 | Linke et al. ............... 296/97 C |
| 4,090,732 A | * | 5/1978 | Vistitsky ................... 296/97 C |
| 4,950,021 A | * | 8/1990 | Vandagriff ................. 296/97.6 |
| 5,031,952 A | * | 7/1991 | Miyamoto et al. ......... 296/97.4 |
| 5,356,192 A | * | 10/1994 | Schierau ................... 296/97.6 |
| 5,470,122 A | * | 11/1995 | Feng ........................ 296/97.6 |
| 5,622,401 A | * | 4/1997 | Ip ............................ 296/97.6 |
| 5,662,371 A | | 9/1997 | Gera et al. |
| 5,711,570 A | | 1/1998 | Wu et al. |
| 5,765,899 A | * | 6/1998 | Watjer et al. ............. 296/97.11 |
| 5,829,816 A | | 11/1998 | Cimmino |
| 5,842,748 A | | 12/1998 | Cummins |
| 5,954,386 A | * | 9/1999 | Thomas ..................... 296/97.2 |

* cited by examiner

*Primary Examiner*—D. Glenn Dayoan
*Assistant Examiner*—Greg Blankenship
(74) *Attorney, Agent, or Firm*—Michael I. Kroll (57) ABSTRACT

The present invention 10 discloses an auxiliary motor vehicle sun visor 26 mounted on a conventional sun visor 14 for use in an automobile 12 wherein the auxiliary visor 26 has means for being extended below the conventional sun visor 14 in order to block sunlight or oncoming headlights. The auxiliary visor 26 is a transparent tinted visor. Alternative embodiments are shown for providing attachment means for the auxiliary sun visor. In a first embodiment the auxiliary sun visor 26 is hinged 28 onto the lower part of the conventional sun visor 14. In a second embodiment, the auxiliary sun visor 26 is connected to a body 38 having clips 40 thereon and rotatable means 42 having a pair of elongated rods 44 wherein the elongated rods slide within a pair of bores 46 in the body of the auxiliary sun visor 26. In a third embodiment, the auxiliary sun visor 48 comprises a plurality of tinted, transparent, extendible visor members 50, 52, 54 having tabs 51, 53, 55 thereon wherein the visor members slide in tracks 58 back and forth to the extendible position.

7 Claims, 10 Drawing Sheets

MOTOR VEHICLE EXTENDABLE SUN VISOR

BACKGROUND OF THE INVENTION

1. Field of the Invention

The present invention relates generally to a motor vehicle sun visor and more specifically to a sun visor having a secondary transparent tinted visor which can be folded or extended below the manufacturer's opaque visor for the purposes of blocking headlights or sun light on a need be basis.

One embodiment provides for the attachment, of a piece of transparent material to the lower edge of the visor by means of a hinge which allows the transparent material to be flipped down to block strong light rays. Another embodiment provides for an apparatus which is clipped onto the top edge of the manufacturer's visor and extends down the back side having hinged and telescopic means whereby the apparatus can be extended below the opaque visor to block out strong light rays or the opaque visor can be left in the inoperative position and the apparatus can be folded down, having hinges, and using the aforementioned telescopic means, can be selectively extended. Another additional embodiment would replace the manufacturer's visor with another visor having within said visor a cavity with a number of selectable tinted transparent visors having slidably extendable means and being placed so that a portion of said visors extend beyond the lower edge of the casing visor in the form of a tab whereby a selection of tints are available.

2. Description of the Prior Art

There are other windshield visor extension device designed for blocking strong light rays. Typical of these is U.S. Pat. No. 5,842,748 issued to Cummins on Dec. 1, 1998.

Another patent was issued to Cimmino on Nov. 3, 1998 as U.S. Pat. No. 5,829,816. Yet another U.S. Pat. No. 5,711,570 was issued to Wu et al. on Jan. 27, 1998 and another was issued on Sep. 2, 1997 to Gera et al. as U.S. Pat. No. 5,662,371 and still yet another patent was issued to Stroth on Jun. 24, 1999 as U.S. Pat. No. 2,422,863.

U.S. Pat. No. 5,842,748

Inventor: Pamela Robin Cummins

Issued: Dec. 1, 1998

A sun visor (10) for a motor vehicle comprises an opaque visor member (12) with internal guide tracks (24) for receiving a support rail (22) of a transparent, glare reducing panel (20). The glare reducing panel is movable between a retracted position within the visor member and an extended position in which it creates a non-glare visual region below the opaque visor member. An additional, smaller panel (38) may overlie a portion of panel (20) and be adjustable in position, to create an enhanced glare reduction portion which may be aligned with the direction of the sun.

U.S. Pat. No. 5,829,816

Inventor: James Cimmino

Issued: Nov. 3, 1998

A vehicle sun visor attachment which includes a glare shield that can be adjusted transversely of the vehicle and can also be pivoted downwardly to increase the effective width of the sun visor. In one form of the invention, the glare shield can also be adjusted to effectively block light rays entering the vehicle side window.

U.S. Pat. No. 5,711,570

Inventor: Sheng-Fen Wu et al.

Issued: Jan. 27, 1998

A telescopic glare shield is provided with an outer shelter and an inner shade board which is adjustably engaged with the outer shelter. The inner shade board has a bulged top end having a mushroom shaped cross section which can be in frictional contact with the inner faces of the outer shelter so as to constantly retain the shade board in place. The outer shelter has a longitudinal extended opening for the passage of the inner shade board and a pair of parallel stop flanges are defined on the edges of opening so as to prevent the inner shade board from disengagement from the outer shelter when pulled down to the bottommost end.

U.S. Pat. No. 5,662,371

Inventor: Sanjay Gera et al.

Issued: Sep. 2, 1997

A sun visor glare reducing extension for incorporation within a vehicle's sun visor is disclosed having a three sided rigid frame capable of being incorporated within a vehicle's sun visor. The frame has a back frame member pivotally affixed to a pair of generally parallel leg segments at each end. Each leg segment forms a "U" shaped retaining channel. A glare shield slidably retained within the "U" shaped retaining channels, and is deployable in a linear manner from the edge of an otherwise conventional sun visor.

U.S. Pat. No. 2,422,863

Inventor: Lowry B. Stroth

Issued: Apr. 2, 1945

This United States Patent discloses a motor vehicle windshield visor having an adjustable section constructed of translucent material, which may be readily extended beyond one longitudinal edge of the main section of the visor, thereby providing a shield for the eyes of the operator of the motor vehicle, against sun rays or light rays from approaching motor vehicle headlights. The invention provides a windshield visor having a compartment for the adjustable section, so that the adjustable section may be moved to a position concealed within the main section of the visor. Further said windshield visor provides means for automatically securing the extension section in various positions of adjustment with respect to the main section. While these windshield visors may be suitable for the purposes for which they were designed, they would not be as suitable for the purposes of the present invention, as hereinafter described.

It is believed that none of these prior art devices incorporate features such as the ability to selectively attach and detach an extension of the present opaque visor as well as pivoting the opaque visor to a non-operative position while the present invention is in an adjustable operative position. In addition an alternate embodiment is provided wherein a number of selectable tinted transparencies are provided for those people or conditions where one color is more suitable than another. Such as, a light amber tint over a dark green tint while driving through areas where you drive from dark shade to bright light such as in the mountains. The extent of the usefulness of the visor extension is not limited to motor vehicle but could just as well be clipped onto a windshield of a boat where it could be extended up as well as down.

Therefore it is believed that a need exists for one or all of the embodiments as described and illustrated herein.

SUMMARY OF THE PRESENT INVENTION

The present invention provides a windshield visor having a hingedly extendable transparent member. One embodiment provides for the attachment of a piece of tinted transparent material, by means of a hinge, wherein said tinted transparent material can be flipped down, especially in a hazardous condition, to block strong light rays.

Another embodiment provides for a device which is clipped onto the top edge of the manufacturer's visor and having hinged and telescopic means that can be extended below the manufacturer's visor to block out strong light rays or the manufacturer's visor can be left in the inoperative position and the device can be folded down using the aforementioned hinges, and having telescopic means that, can be selectively extended below the manufacturer's visor.

Another additional embodiment would replace the manufacturer's visor with another visor having a cavity with a number of slidably selectable tinted transparent members being placed so that a portion of said visor members extends beyond the lower edge of the casing visor in the form of a tab providing means for selecting a particular member.

A primary object of the present invention is to provide a tinted transparent extension to a windshield visor which can be easily and quickly engaged to block strong light rays.

Another object of the present invention is to provide a tinted transparent extension to a windshield visor which is hinged to the bottom edge of the manufacturer's visor and can be folded down to block strong light rays on a selectable basis.

A still further object of the present invention is to provide an apparatus which can be clipped to the top edge of the manufacturer's visor and can be telescopically extended down beyond the manufacturer's visor to block strong light rays on a selectable basis.

A yet further object of the present invention is to provide an apparatus which can be clipped to the top edge of the manufacturer's visor having hinged means for folding down independently and can be telescopically extended to a selectable position to block strong light rays.

Another object of the present invention is to provide a visor having a selection of different tints to choose from.

A still further object of the present invention is to provide a visor having a selection of different tinted members which can be selectively extended from within a compartment.

Additional objects of the present invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

LIST OF REFERENCE NUMERALS

With regard to the reference numerals used, the following numbering is used throughout the drawings.

10 present invention
12 automobile
14 left sun visor
15 right sun visor 16 windshield
18 sun visor mounting means
20 rod
22 bore
24 means for connection
26 auxiliary visor
27 direction arrow
28 hinged means
30 lower edge of sun visor
32 clip-on telescopic visor
34 hinged means
36 telescopic means
38 clip body
39 cavity
40 clip
42 rotatable body
44 elongated rod
46 bore
47 upperedge
48 left visor
49 right visor
50 replacement visor
51 tab
52 replacement visor
53 tab
54 replacement visor
55 tab
56 track member
58 individual track
60 spring
62 projection
63 stop
64 direction arrow

DESCRIPTION OF THE PREFERRED EMBODIMENT(S)

Turning now descriptively to the drawings, in which similar reference characters denote similar elements throughout the several views, FIGS. 1 through 10 illustrate the present invention being an auxiliary sun visor for motor vehicles.

Figure 1:
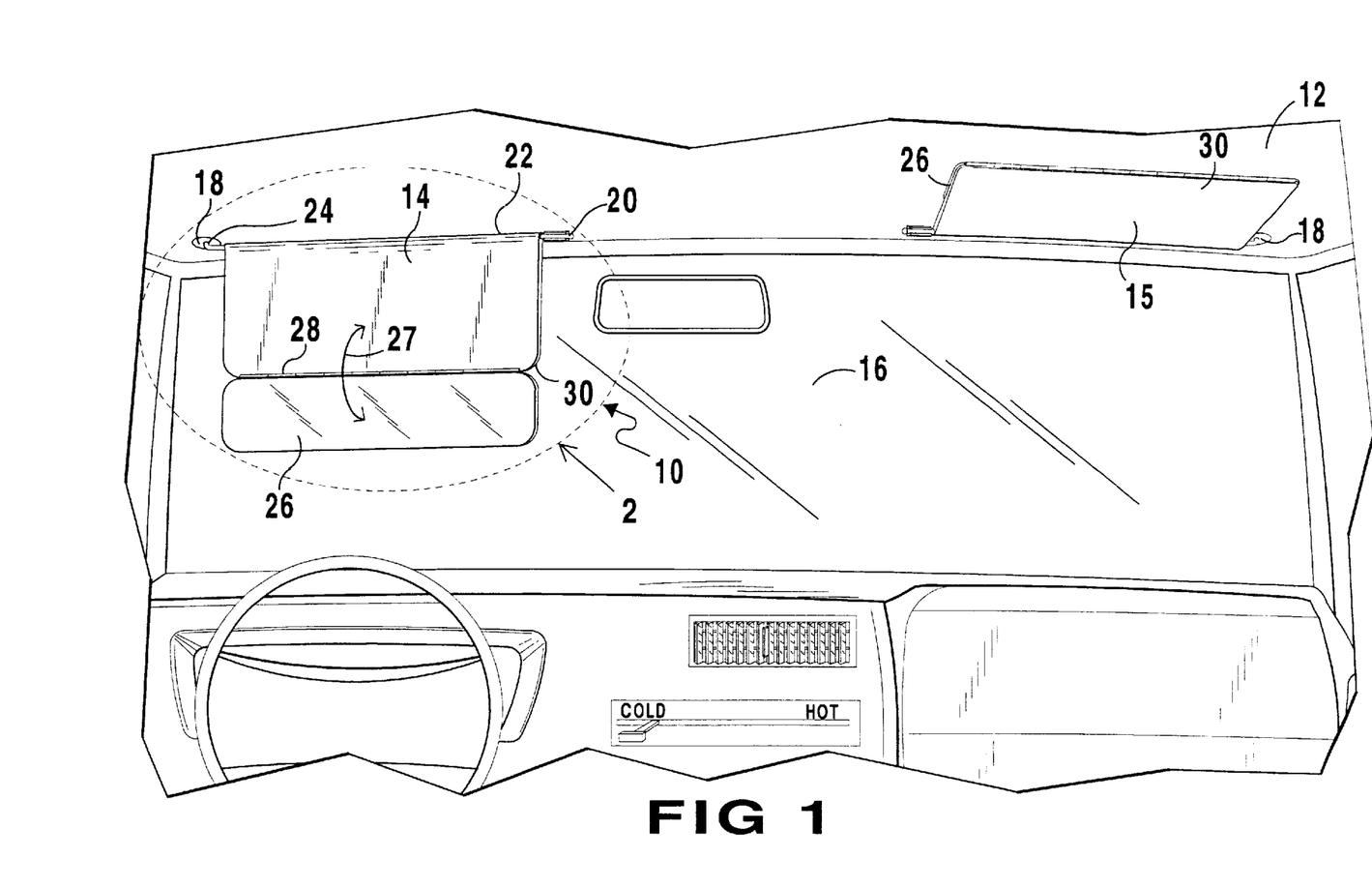
FIG. 1 is a perspective view of one of the embodiments of the present invention showing the inside of a vehicle looking at the windshield showing the present invention hingedly extended to the operative position on the left visor and hingedly folded to the non-operative position on the right visor.

Turning to FIG. 1, therein is shown a perspective view of one of the embodiments of the present invention generally shown at 10. Shown therein is the inside of an automobile 12 along with the conventional left sun visor 14 and right sun visor 15 of an automobile. Also shown is the windshield 16 of the automobile along with the mounting means 18 of the conventional sun visor for attaching the sun visor to the roof of the automobile 12. The conventional sun visors 14 and 15 have a rod 20 which runs through a longitudinal bore 22 formed in the sun visor upper edge which will accept the rod 20 which rod has connecting means 24 to the mounting means 18. The conventional sun visor 14 is a flat, rectangularly shaped object which rotates about the rod 20 in order to allow the driver of the car to block sunlight rays from the eyes of the driver. The present invention 10 is a secondary or auxiliary transparent, opaque, tinted visor 26 being a thin, rectangularly shaped visor which is an auxiliary visor attached by hinged means 28 to the lower edge 30 of the sun visor 14. The auxiliary transparent, tinted visor 26 can be folded or extended below the manufacturer's conventional visor 14 for the purposes of blocking headlights, sunlight or road glare on a need-be basis. Shown is one auxiliary visor 26 in the operative position on the left visor 14 and the other auxiliary visor 26 hingedly folded to the non-operative position on the right visor 15. Arrow 27 shows the folding direction of auxiliary visor 26.

Figure 2:
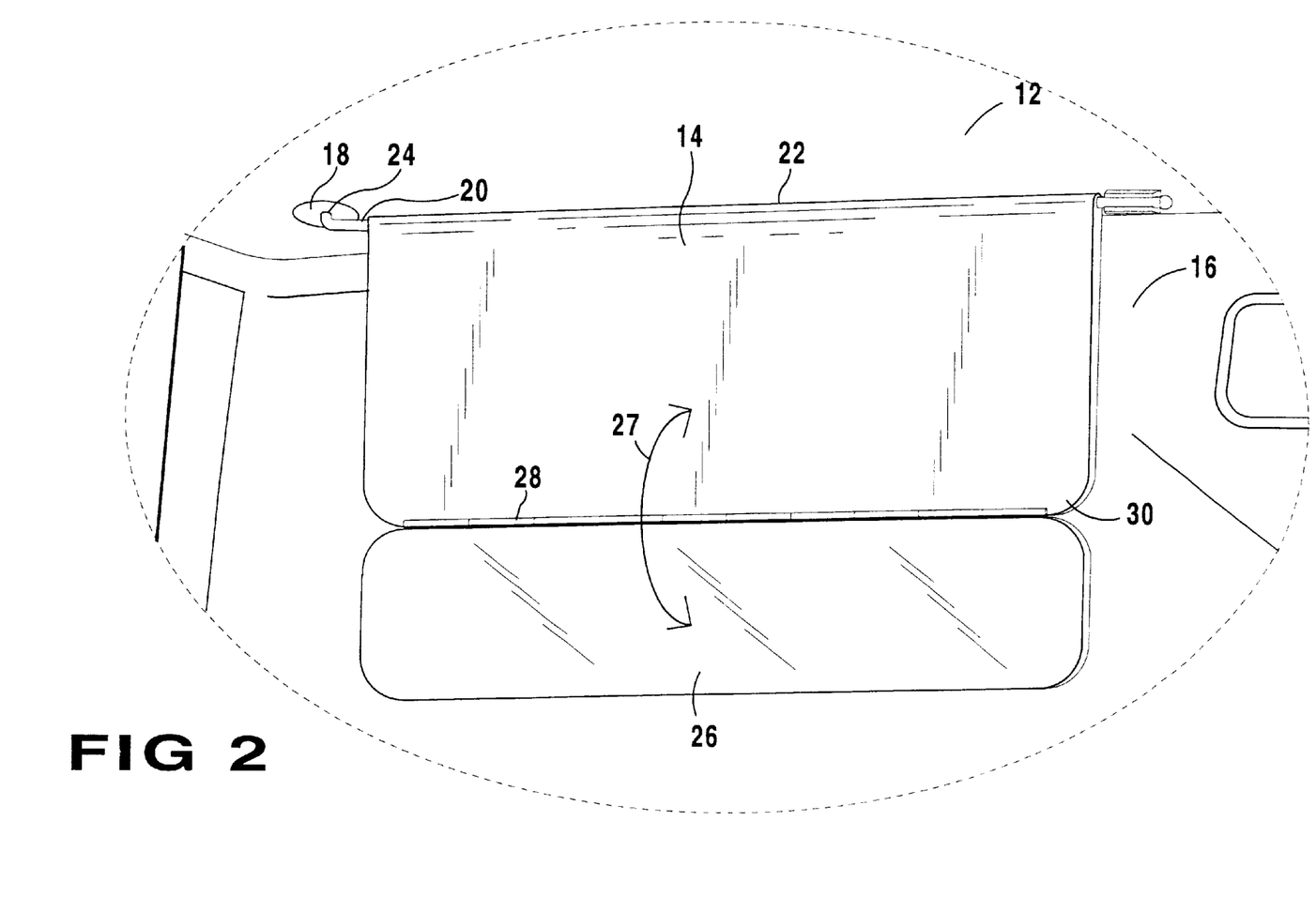
FIG. 2 is an enlarged perspective view, taken from FIG. 1 as indicated, showing a visor having an additional tinted transparent member attached thereto by means of a hinge and positioned in the operative position.

Turning to FIG. 2, therein is shown an enlarged perspective view, taken from FIG. 1 as indicated, showing a conventional sun visor 14 having an auxiliary tinted, transparent member 26 attached thereto by means of a hinge 28 on lower edge 30 and positioned in the operative position as shown. Also shown is the mounting means 18, means of connecting 24, the rod 20 along with the bore area 22 of the conventional visor 14. Arrow 27 shows the folding direction of auxiliary visor 26.

Figure 3:
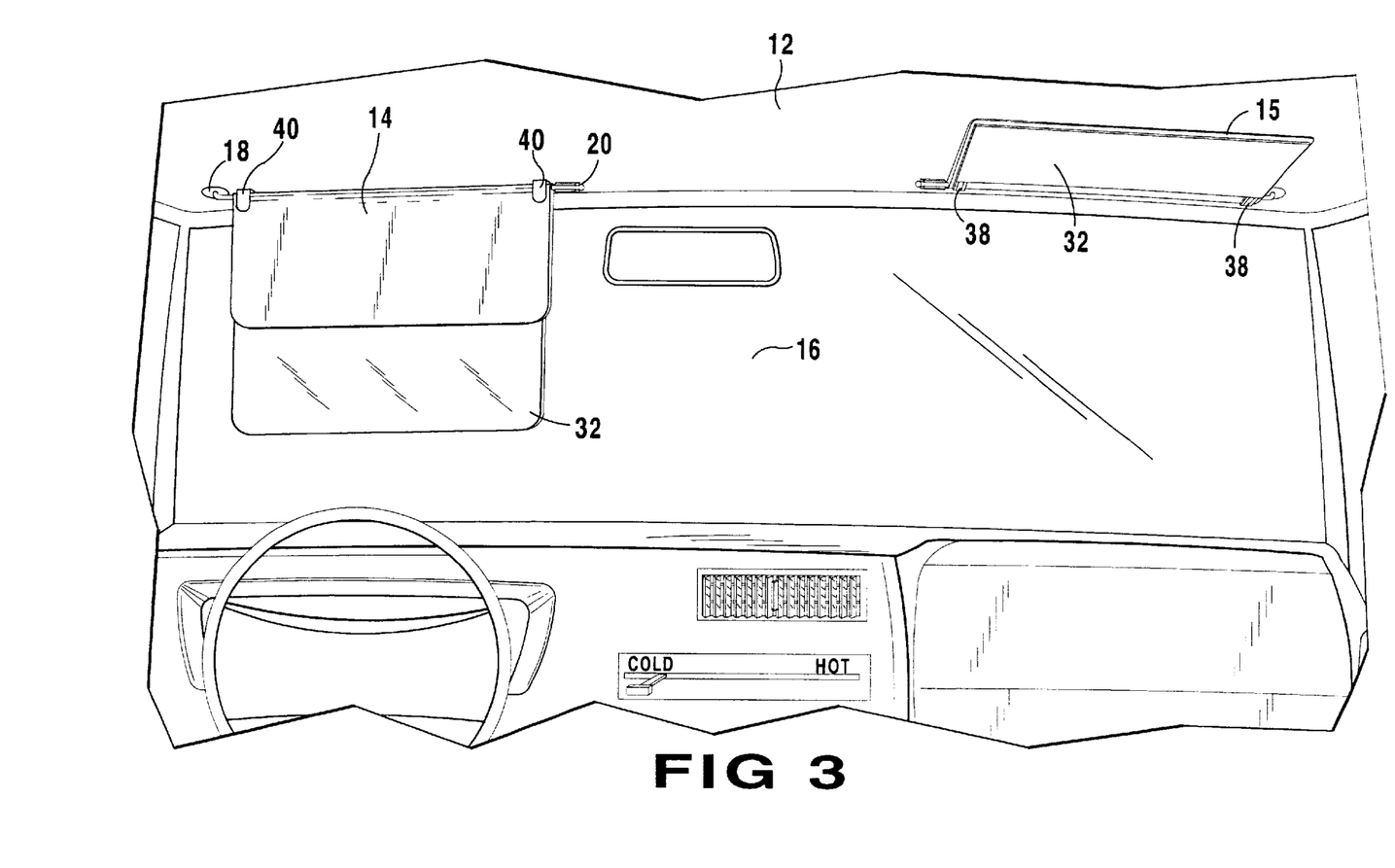
FIG. 3 is a perspective view of another embodiment of the present invention showing the inside of a vehicle looking at the windshield showing the clip-on telescopic visor in the operative position on the left visor and stored in the non-operative position on the right visor.

Turning to FIG. 3, therein is shown a perspective view of another embodiment of the present invention showing the inside of an automobile 12 looking at the windshield 16 showing the clip-on telescopic visor 32 in the operative or extended position on the left visor 14 and stored in the non-operative position on the right visor 15. Clips 40 and clip body 38 are also shown and will be further described hereinafter.

Figure 4:
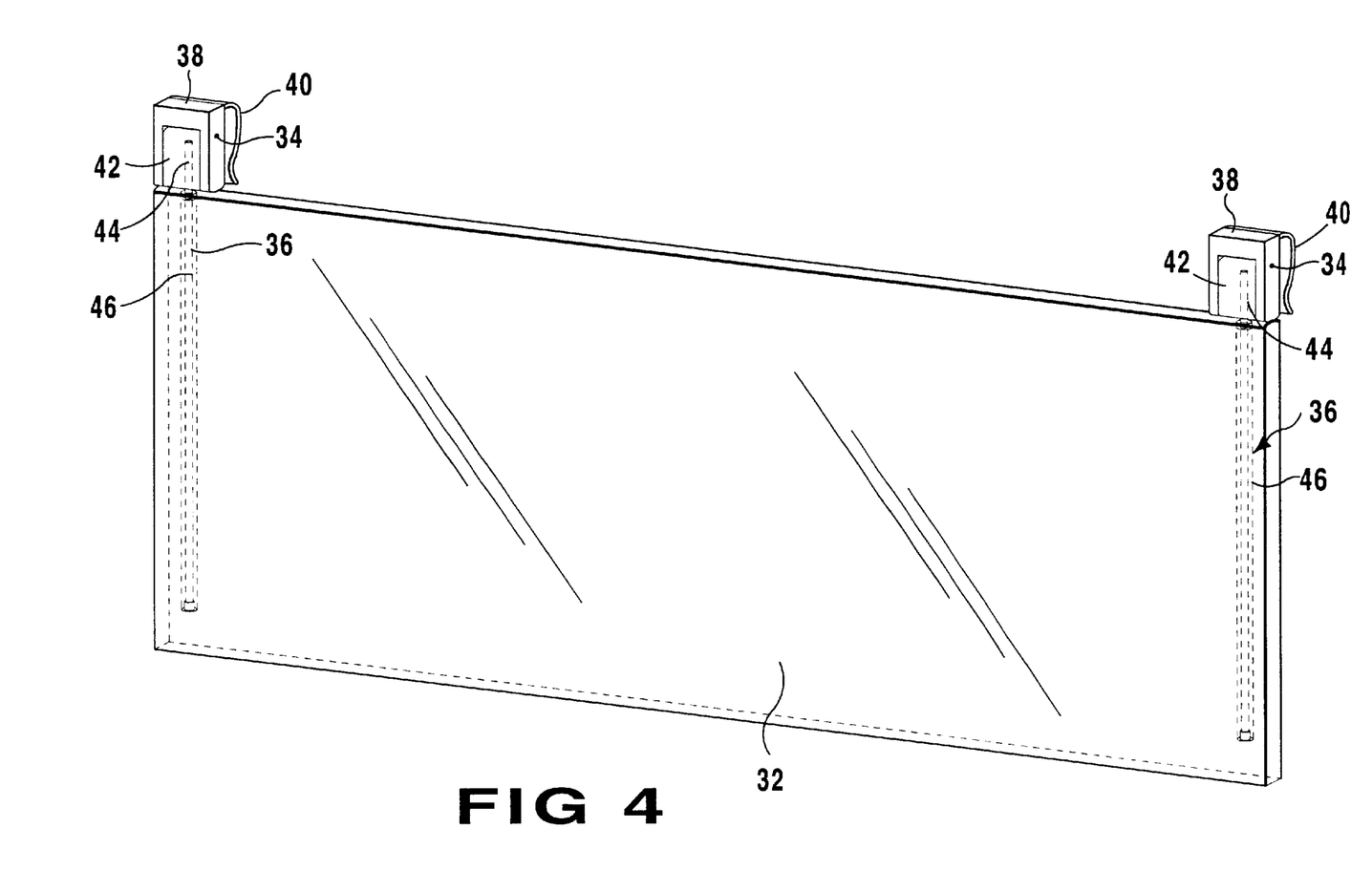
FIG. 4 is a perspective view of the embodiment shown in FIG. 3. Shown is the clip-on telescopic visor having hinged means for using the visor without folding down the manufacturer's visor and having telescopic means for extending said clip-on visor to a user selectable position.

Turning to FIG. 4, therein is shown a perspective view of the embodiment previously shown in FIG. 3. Shown is the clip-on, telescopic visor 32 having hinged means 34 for using the auxiliary visor without folding down the manufacturer's visor (not shown) and having telescopic means 36 for extending the clip-on visor 32 to a user selectable position. Shown therein are a pair of housing bodies 38 having flexible tensioned metallic or plastic or like clips 40 mounted thereon having a rotatable body 42 mounted therein to a hinge means 34. Fixedly mounted in rotatable body 42 is a rod-like body 44 being elongated which rod communicates with the visor 32 by means of a bore 46 which bore allows the visor 32 to slide back and forth on the rod 44. Note that one of a pair of telescoping means are located on each end of visor 32.

Figure 5:
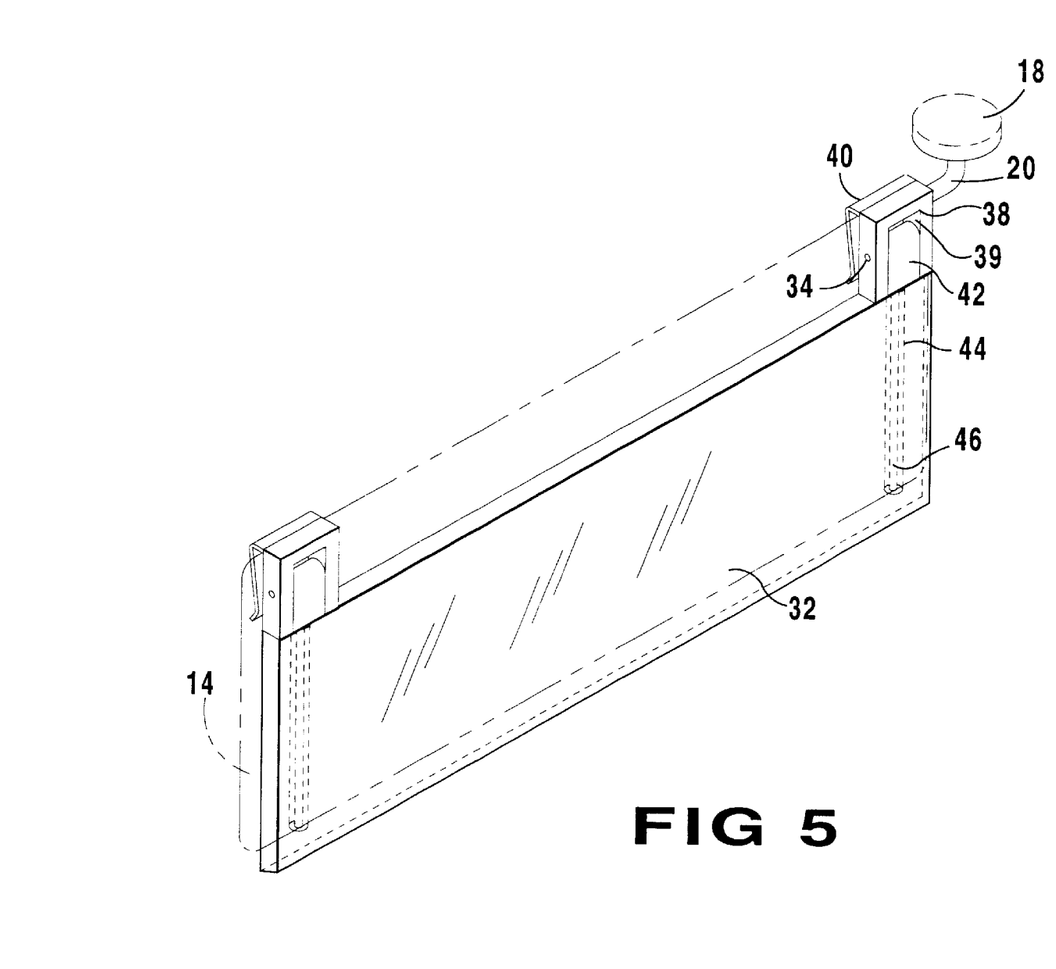
FIG. 5 is a perspective view of the embodiment shown in FIG. 3. Shown is a rear view of a visor, shown in phantom in the operative position, with the clip-on hinged telescopic visor in the non-operative position.

Turning to FIG. 5, therein is shown a perspective view of the embodiment shown in FIGS. 3 and 4. Shown is the rear view of the visor 14 shown in phantom in its operative folded down position, with a clip-on hinged visor 32 in the non-operative position. Other features of FIGS. 3 and 4 are also shown. Enclosure 38 has a cavity 39 therein in which rotatable body 42 operates and is hingedly 34 connected.

Figure 6:
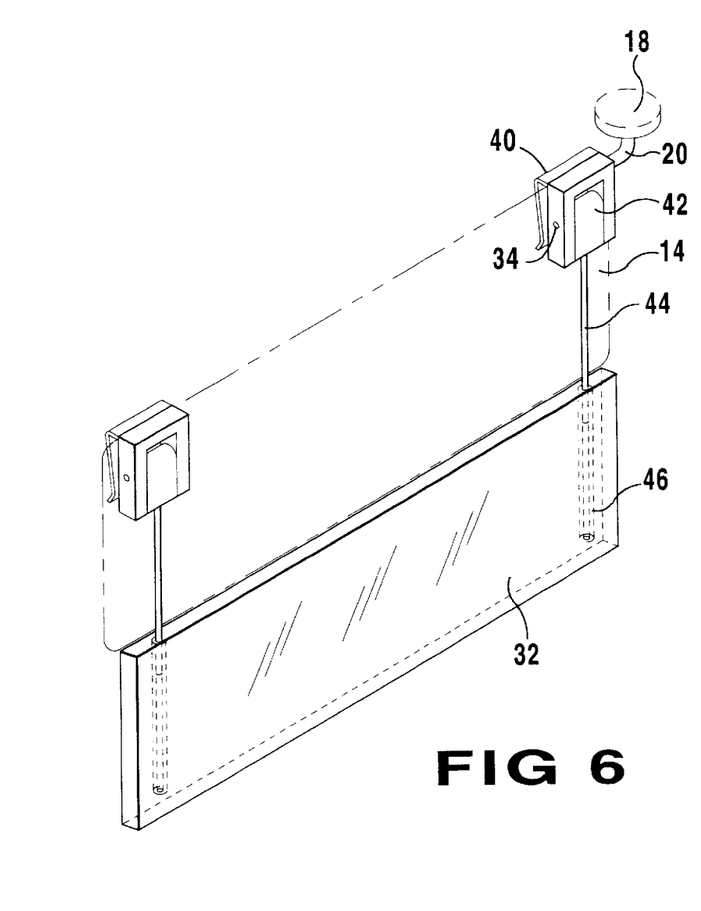
FIG. 6 is a perspective view of the embodiment shown in FIG. 3. Shown is a rear view of a visor, shown in phantom in the operative position, with the clip-on hinged telescopic visor extended by telescopic means below the manufacturer's visor.

Turning to FIG. 6, therein is shown a perspective view of the embodiment shown in FIGS. 3, 4 and 5. Shown is a rear view of the visor 14 shown in phantom in its operative position. Also shown is the clip-on hinge and telescopic visor 32 in an extended position shown below the manufacturer's conventional visor 14. Shown are the clip bodies 38, clip 40 for frictionally attaching auxiliary visor 32 to conventional visor 14, hinge means 34, the rotatable body 42, a rod 44 along with the bore 46 of the telescopic visor 32. Also shown is the means for connection 18 to the automobile roof and the rod 20 of the conventional sun visor 14. Visor 32 slides into its operative down position by being pulled away from clip bodies 38 being slidable on rods 44.

Figure 7:
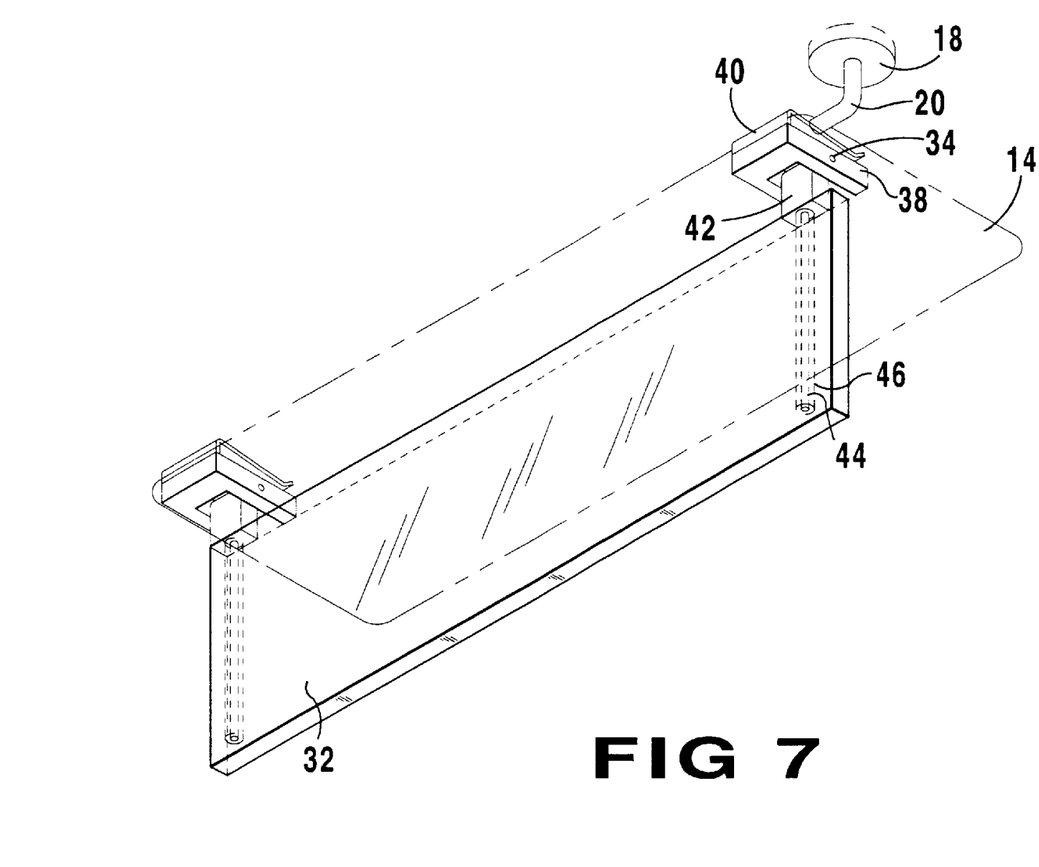
FIG. 7 is a perspective view of the embodiment shown in FIG. 3. Shown is a rear view of a visor, shown in phantom in the non-operative position, with the clip-on hinged telescopic visor folded down.

Turning to FIG. 7, therein is shown a perspective view of the embodiment shown in FIGS. 3–6. Shown is a rear view of a visor 14 shown in phantom in the nonoperative position with the clip-on hinged telescopic visor 32 shown folded down normal to conventional visor 14. Also shown are several elements as previously discussed in FIGS. 3–6.

Figure 8:
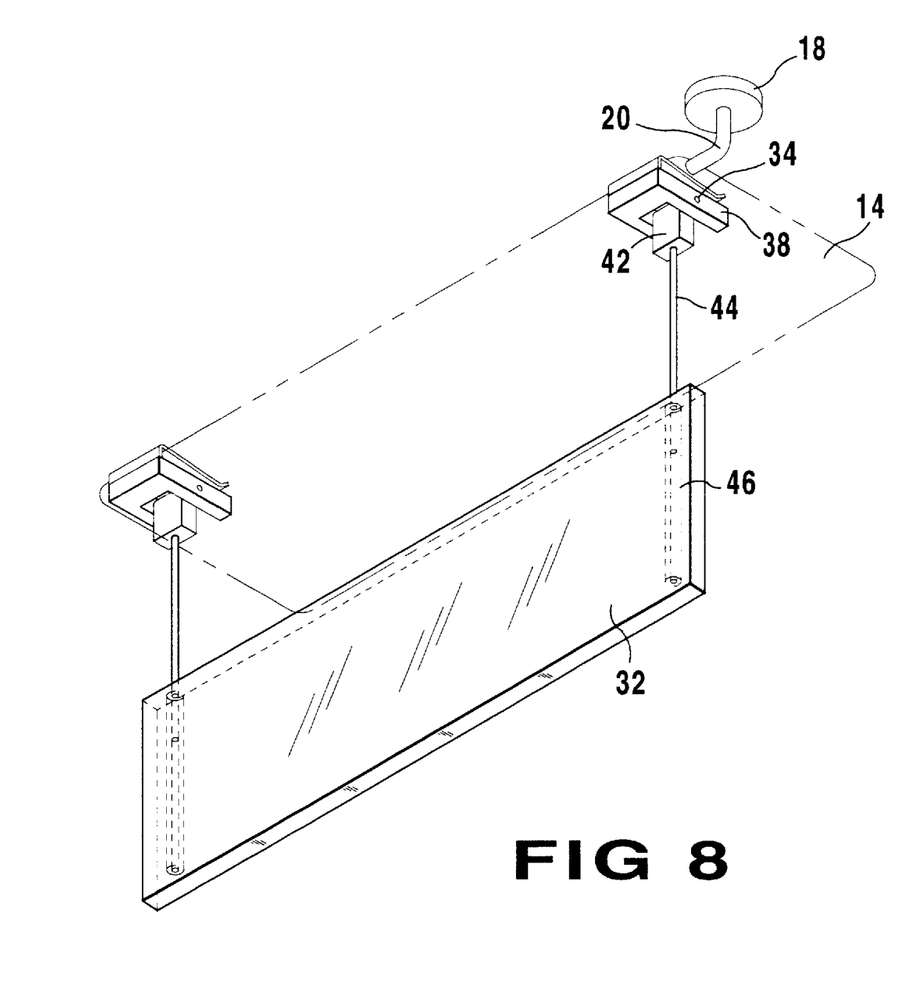
FIG. 8 is a perspective view of the embodiment shown in FIG. 3. Shown is a rear view of a visor, shown in phantom in the non-operative position, with the clip-on hinged telescopic visor folded down and extended by telescopic means to a user selectable position.

Turning to FIG. 8, therein is shown a perspective view of the embodiment shown in FIG. 3. Shown is a rear view of a visor 14 shown in phantom in the nonoperative position with the clip-on hinged telescopic visor 32 folded down and extended by telescopic means to a user-selectable position. Also shown are several elements as previously discussed in FIGS. 3–7. It can be seen that rotatable body 42 pivots on hinge means 34 into a position normal to conventional visor 14.

Figure 9:
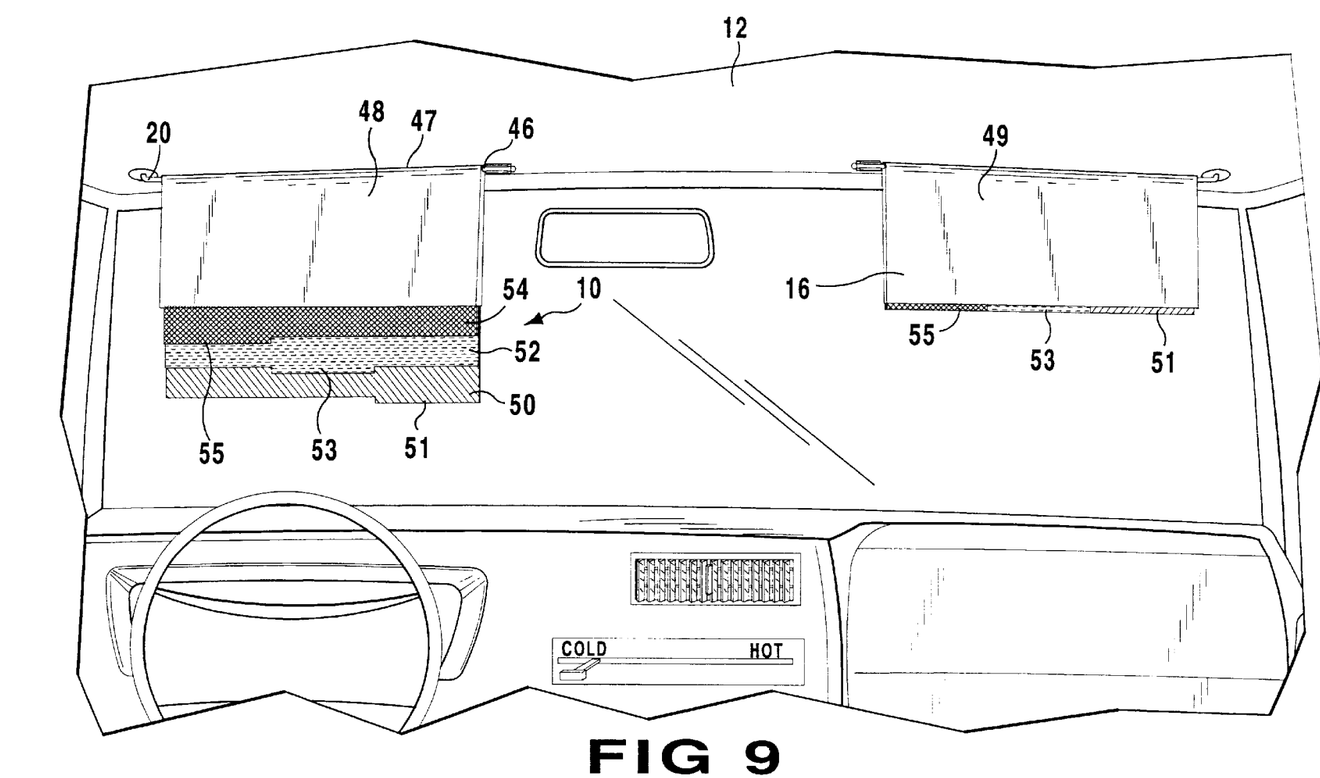
FIG. 9 is a perspective view of an additional embodiment of the present invention showing the inside of a vehicle looking at the windshield showing the new visor having a compartment with a plurality of tinted transparent extendable visor members in a partially extended position on the left visor and the right visor showing the additional visors in the stored position wherein the user has a tab for each tinted transparency extending below the visor compartment for selection and extension purposes.

Turning to FIG. 9, therein is shown a perspective view of an additional embodiment of the present invention 10 showing the inside of an automobile 12 looking at the windshield 16 showing visors 48 and 49 which replace the conventional visors (not shown). The replacement visors 48 and 49 being a compartment or enclosure with a longitudinal bore 46 in its upper edge 47 for attachment to rod 20 with a plurality of tinted, transparent, extendible visor members 50, 52 and 54 housed therein shown in a partially extended position on the left visor 48. The right visor 49 shows visors 50, 52 and 54 in the stored and concealed position wherein the user has a projecting tab 51, 53 and 55 for each tinted visor extending below the visor compartment for selection and extension purposes.

Figure 10:
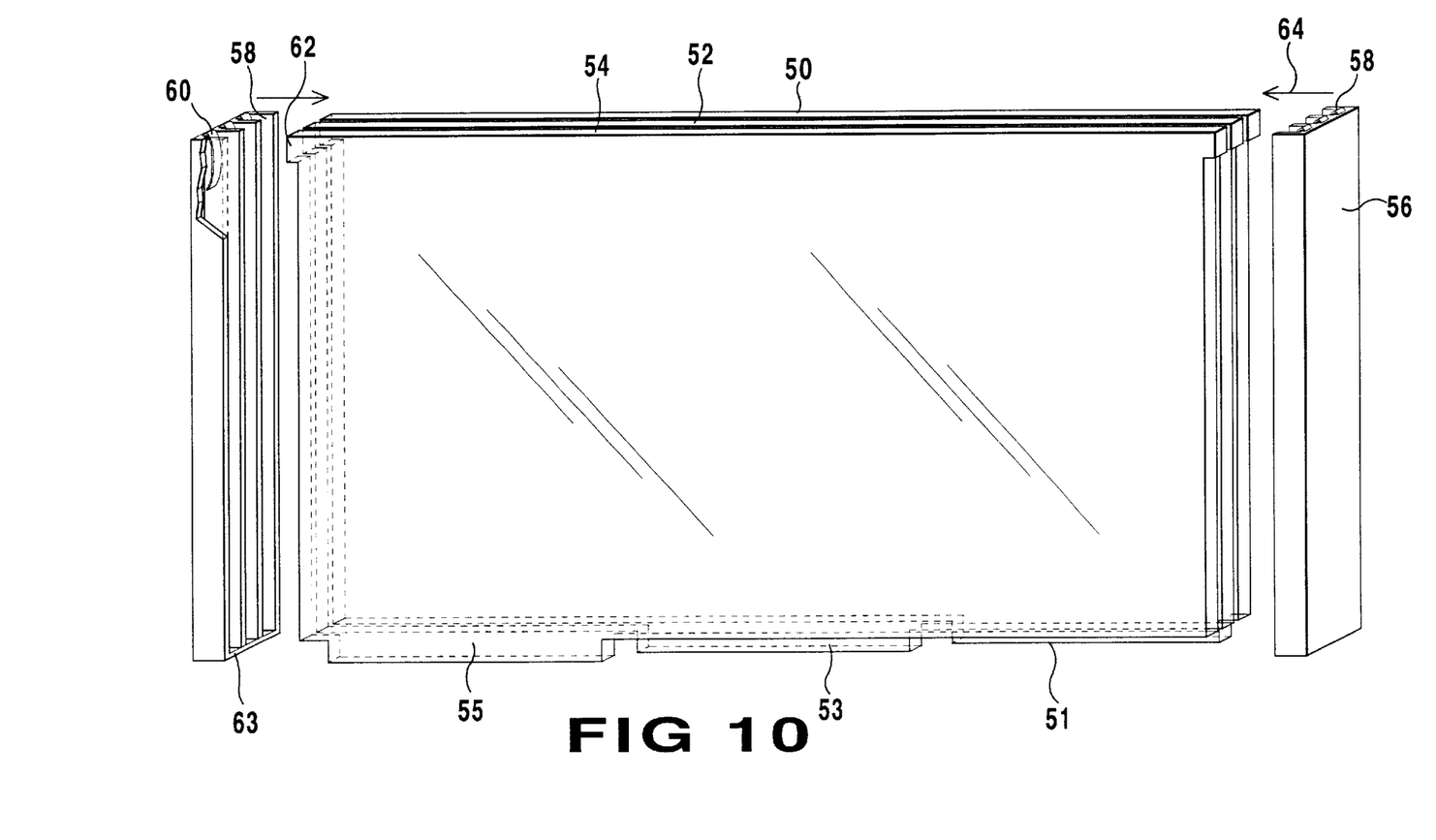
FIG. 10 is a diagrammatic view of the additional embodiment shown in FIG. 9. Shown is the track which is located on each side of the visor compartment, not show, wherein each track houses an extendable tinted transparent visor therein. Also shown is a compression spring located on the top of each side to keep the extendable tinted transparent visors in the selectable non-operative position.

Turning to FIG. 10, therein is shown a diagrammatic view of the additional embodiment shown in FIG. 9. Shown is the track housing member 56 which is located on each end of the visor compartment (not shown) wherein each track 58 houses an extendible, tinted, transparent visor 50, 52 or 54 therein. Also shown is a compression spring 60 located on the top of each track member side 56 to frictionally movably secure the extendible, tinted, transparent visors 50, 52 and 54 in the selectable, non-operable position. The track member 56 has a stop means 63 located on its lower edge so that a protruding finger or projection 62 located on the top edge of the visors 50, 52 and 54 will catch on the stop 63 to hold the auxiliary visors 50, 52 and 54 in the operative position. Arrows 64 show how track members 56 mate with visors 50, 52 and 54.

What is claimed is:

1. An apparatus for attachment to a vehicle sun visor, comprising:

a) an auxiliary sun visor;

b) said auxiliary sun visor being thin;

c) said auxiliary sun visor being rectangularly shaped;

d) means for attachment of said auxiliary sun visor to the vehicle sun visor, whereby road glare is reduced; and e) said means for attachment further comprises a pair of enclosures having spring clips mounted thereon, said spring clips for being attached to the vehicle sun visor, said enclosures having means for telescopic attachment to said auxiliary sun visor, said pair of enclosures having a cavity therein having rotatable bodies therein, said rotatable bodies having a hinged connection to said pair of enclosures, said hinged connection being positioned in said cavity.

2. The apparatus of claim 1, wherein said auxiliary sun visor is tinted.

3. The apparatus of claim 1, wherein said auxiliary sun visor is opaque.

4. The apparatus of claim 1, said rotatable bodies having an elongated rod connected thereto, said auxiliary sun visor having a bore therein, said elongated rod being slidably connected to said auxiliary sun visor through said bore.

5. The apparatus of claim 1, wherein said spring clips are frictional spring clips.

6. The apparatus of claim 1, wherein said pair of enclosures are made of metal.

7. The apparatus of claim 1, wherein said pair of enclosures are made of plastic.

* * * * *